United States Patent [19]

Grejsner

[11] 4,269,739

[45] May 26, 1981

[54] AGENT FOR SURFACE TREATMENT AND CLEANING OF RECORDS AND SIMILAR OBJECTS

[75] Inventor: Teddy Grejsner, Taastrup, Denmark

[73] Assignee: CBS Records ApS, Vanlose, Denmark

[21] Appl. No.: 63,399

[22] Filed: Aug. 3, 1979

[30] Foreign Application Priority Data

Aug. 4, 1978 [DK] Denmark .............................. 3461/78

[51] Int. Cl.³ .............................................. C11D 3/60
[52] U.S. Cl. ...................................... 252/547; 106/10; 106/287.14; 252/11; 252/49.6; 252/89.1; 252/165; 252/174.15; 361/212
[58] Field of Search ................... 252/547, 174.15, 165, 252/89.1, 11, 49.6; 361/212; 106/10, 287.14

[56] References Cited

U.S. PATENT DOCUMENTS

| 2,937,098 | 5/1960 | Geen ....................................... 106/10 |
| 3,163,547 | 12/1964 | Vietor ................................ 106/10 X |
| 3,847,622 | 11/1974 | Brandl et al. ........................... 106/10 |
| 3,856,533 | 12/1974 | Schnurrbusch et al. ............... 106/10 |
| 3,965,520 | 6/1976 | Maier ................................. 252/106 X |
| 4,202,787 | 5/1980 | Davis ................................. 252/170 X |
| 4,213,870 | 7/1980 | Loran ................................. 252/51.5 R |

FOREIGN PATENT DOCUMENTS

| 1422540 | 8/1970 | Fed. Rep. of Germany . |
| 1074871 | 10/1954 | France . |
| 1007336 | 10/1965 | United Kingdom ..................... 361/212 |

*Primary Examiner*—Harris A. Pitlick
*Attorney, Agent, or Firm*—Lewis H. Eslinger

[57] ABSTRACT

An agent for surface treatment and cleaning of objects, in particular records, video or sound heads, tape paths in tape recorders or pickup styli, containing in a dissolved or emulsified form from 0.001 to 1.2% by weight of natural or synthetic wax or wax-like substance, from 0.001 to 2.5% by weight of fluid silicone oil with lubricating activity, from 0.001 to 2.5% by weight of surface-active polysiloxane copolymer, from 0.001 to 1.2% by weight of fluorinated organic surface-active compound, and from 0.001 to 2.5% by weight of nonionic surfactant.

7 Claims, No Drawings

AGENT FOR SURFACE TREATMENT AND CLEANING OF RECORDS AND SIMILAR OBJECTS

The present invention relates to an agent for surface treatment and cleaning of objects, in particular records, video or sound heads, tape paths in tape recorders or pickup styli, in which an antistatic-acting agent is dissolved or emulsified in water, a mixture of water and an alcohol or a fluorinated hydrocarbon.

Especially in connected with the pure synthetic plastic materials there often occurs problems of static electricity, i.e. the charging occurring by direct friction between two non-conductive materials.

The purer a material is, the more it is exposed to static electricity.

During normal handling of records, made of PVC, the records will often be exposed to influences of such a nature, e.g. rubbing against the sleeve, that the records will be electrostatically charged.

The result of such charging is that the records will be surrounded by an electric field which will partly cause dust particles to fasten to the records, capable of scratching the records or damaging them in some other manner during the handling of the records, and may partly occasion electric discharges ("sparks") which may manifest themselves during playing as undesirable noise.

A large number of agents and remedies ostensibly serving to remove said drawbacks are available on the market today. These aids fall into two main categories. One group comprises objects such as brushes, rollers, cloths etc. by means of which it is possible to remove the dust without giving the record a treatment changing its ability to be charged, thereby attracting dust again.

The other group comprises liquids, often in the form of aqueous or alcoholic solutions that may be distributed on the surfaces of the records by application or spraying. Said liquids contain substances, such as antistatic substances, rendering the records surface semiconductive, and if a record treated with such an agent is exposed to an influence causing electric charging the electrostatic charges will be led away, and dust will neither be attracted nor fasten to the record if accidentally landing there.

The prior art also teaches the incorporation of antistatic substances in the material, such as polyvinyl chloride (PVC), of which the records are made.

For example, the specification of French Pat. No. 1,074,871 teaches the application of a thin layer of antistatic-acting liquid alkyl polysiloxanes to records. Said type of agents are applicable in the form of solutions of silicones of said type, such as methyl polysiloxane, in organic solvents or in the form of aqueous emulsions, e.g. by spraying. Following evaporation of the solvent a thin layer of silicone is left distributed on the surface of the record. The antistatic effect achieved by this type of agent, however, is of rather short duration, and the effect will therefore soon diminish when the record is used.

An antistatic agent for surface treatment of records also known in the prior art is the use of aqueous or alcoholic solutions of quaternary ammonium sulphates, see e.g.

DAS No. 1,422,540 which mentions alcoholic solutions containing in addition to quaternary ammonium salts also viscosity-reducing or absorbent agents, such as sorbitol. Although an excellent and relatively lasting antistatic effect is achievable hereby, the deposited substances will counteract the motion of the pickup stylus resulting in deteriorated acoustic reproduction. Antistatic agents proposed for incorporation into insulating materials are i.a. a mixture of an electrolyte and a surfactant, cf. French Pat. No. 1,296,756, which teaches a method of rendering sulphur antistatic by admixture of an electrolyte and a polyoxyalkylated alkyl phenol, and an alkali metal alkyl sulphonate, cf. U.S. Pat. No. 3,875,082 which relates to an antistatic PVC mixture containing said substance, e.g. in a quantity of 1% uniformly distributed in the PVC substance.

It has turned out that all prior art agents for treatment of records suffer from substantial drawbacks. Some of the known agents produce an unsatisfactory antistatic effect, the effect being too poor or diminishing too quickly. Other agents have satisfactory antistatic effect, but produce stylus noise or acoustically distorted reproduction owing to solid particles being deposited in the grooves of the record.

When playing a record there is direct friction between the points of contact, i.e. the stylus of the pickup unit and the wall of the record groove. In an untreated record this will produce considerable generation of heat and electrostatic charging which cannot be led away. Under these circumstances the accumulated impurities, such as dust particles, will fasten firmly on the stylus of the pickup, the stylus being able to work as a grinding compound scratching the record or deforming the shape of the groove. The result hereof will be that the stylus is incapable of proper tracking so that the sound picture will be distorted and increasing surface and playing noise will occur. In this manner lasting damage to the record may occur in a short time, and its quality is permanently deteriorated.

Said problems are particularly great in modern records which are played with a low speed of rotation and low tracking force. Modern Hi-Fi-technology often operates with tracking forces from 10 to 15 mN, i.e. from one half to one third of the normal standard of previous times. Moreover, modern records have a greatly extended frequency range and improved signal-to-noice ratios. Hence, the contents of the fine ultra-short groove oscillations, i.e. groove modulations, have been considerably increased.

On account of the reduced tracking force the stylus will to a lesser extent be capable of pushing aside the particles which the stylus runs into, whereby the stylus loses contact with the groove and causes a crackling or crunching.

Although some prior art liquid treatment agents are capable of providing a good antistatic effect, said agents are inclined to leave residues of evaporation in considerable quantity and of high adhesive power. Such residues of evaporation may consist of particles or sticky films blocking the finest groove modulations thereby causing noise or deteriorated sound reproduction, especially in case of the high frequencies.

The present invention is based on the realization that an ideal treatment agent for records must possess a number of properties. For example, obtaining a satisfactory antistatic effect is not sufficient. It is also necessary that the film deposited on the surface of the record has a suitable consistency and optimum physical and mechanical properties, such as low interface tension, good adhesive properties on the PVC surface, good lubricating and heat dissipating properties, and the ability to preserve a cohesive film of unchanged consistency.

The agent according to the present invention is characteristic in that it contains in dissolved or emulsified form (A) from 0.001 to 1.2 percent by weight of natural or synthetic wax or a wax-like substance with a melting point at from 70° to 150° C., (B) from 0.001 to 2.5 percent by weight of fluid silicone oil with lubricating activity, (C) from 0.001 to 2.5 percent by weight of surface-active polysiloxane copolymer, (D) from 0.001 to 1.2 percent by weight of fluorinated organic surface-active compound, and (E) from 0.001 to 2.5 percent by weight of nonionic surfactant.

It has been established that an agent of such composition has not only an antistatic activity of a long duration not previously achieved, but it also provides an unexpectedly good sound reproduction that lasts for a very long time, possibly throughout the life of the record, from just a single treatment. Thus, the agent displays preserving, lubricating, soaking, cleaning, surface-active and surface-stable as well as self-smoothing properties.

The agent in the form of an o/w emulsion is both a protective and a cleaning agent that may be applied to old as well as new PVC records.

In order to achieve this result all the components mentioned under point A-E are necessary. The activity is undoubtedly of a synergistic nature, the omission of a single component having as a result that no satisfactory electrostatic effect is achieved, that the effect becomes too brief, or that the sound reproduction is deteriorated. Thus, an omission of component (E), for example, will result in the deposit or desiccated silicone oils causing deteriorated sound reproduction.

The wax component (A) promotes the adhesive property and therefore contributes towards the achievement of a constant effect.

The silicone oil (B) brings about a lubricating effect and reduced friction so that even in the event of very low tracking force the pickup needle will follow all oscillations of the groove of the record. Components (C) and (D) both have surface-active effect, and the combination will both reduce surface tension and provide optimum antistatic effect. Component (D) in particular exerts a powerful effect in this respect, but cannot be used without the simultaneous presence of component (C), as the hardness would become too great, resulting in deteriorated sound reproduction.

Components (C) and (E) have an oil-like consistency; both improve the smoothing properties and increase the moisture content of the surface film so that the tracking force can be reduced to a minimum.

An additional improvement of the antistatic effect and the acoustic conditions may be achieved by a preferred embodiment of the agent according to the invention, containing additionally in dissolved or emulsified form (F) from 0.001 to 1.2 percent by weight of sodium dialkyl sulphosuccinate and/or (G) from 0.001 to 1.2 percent by weight of phosphate or nitrate of stearamido propyldimethyl-$\beta$-hydroxyethyl ammonium.

Component (F) increases the adhesive properties and at the same time increases the antistatic effect, and component (G) causes an additional increase of the antistatic effect.

Optimum properties in physical and acoustic respect are provided by an agent according to the invention consisting of an aqueous medium in which the following components have been emulsified:

(A) from 0.001 to 0.3 percent by weight of wax, (B) from 0.004 to 2.0 percent by weight of dimethyl polysiloxane or a copolymer hereof, (C) from 0.004 to 1.5 percent by weight of siloxane glycol copolymer or modified organopolysiloxane copolymer, (D) from 0.001 to 0.3 percent by weight of fluorinated organic surfactive compound, and (E) from 0.004 to 1.5 percent by weight of nonylphenol ethoxylate, the quantities being based on the total weight of the emulsion.

If desired, the agent according to the invention may be sold in concentrated form and may be diluted by the consumer by means of water or water and an alcohol to obtain the recommended concentration yielding the best result. The addition of an alcohol produces an increased rate of evaporation whereby the record can be played soon after the treatment. For example, methanol, ethanol and isopropanol are particularly suited for dilution in quantities of up to 60% of the weight of the emulsion. A fluorinated hydrocarbon as solvent or outer phase for the emulsion provides an even higher rate of evaporation. In this manner, however, the emulsions obtained are not so stable, but the products are nevertheless applicable if shaken immediately before use. The fluorinated hydrocarbons also have an extremely low interface tension.

Examples of suitable products that may enter as component (A) in the agent according to the invention are naturally occurring waxes such as Montan wax, Carnauba wax and Ceresin. Examples of such products are "Hoechst Wachs" with the type designation KLE, KPE, KSE, KSL, KPS and KSS.

These products appear as chips, containing 100% active components, of raw Montan wax, or as 5% emulsions. The three types first mentioned are emulsifier-containing and nonionic, whereas the three last-mentioned types are free from emulsifier, the products mentioned under (E), (F) or (G) being applicable as emulsifier.

Examples of commercial synthetic waxes are products bearing the designation: "Hoechst Wachs" and the type designations TM CSE and TM CS.

Said products, being available in pure, concentrated form, may be dissolved in ethanol or emulsified in water. The first-mentioned type is emulsifier-containing and nonionic in 5% emulsions, whereas the last-mentioned type is free from emulsifier. For emulsification hereof the products mentioned under (E), (F) or (G) can be used as emulsifiers.

Examples of suitable synthetic waxes are low-molecular polyethylene products commercially available in the form of aqueous emulsions having a solid matter of from 35 to 40%, such as bearing the trade names "Hoechst Licomer-Dispersion" PE 02 and VP W11.

Synthetic wax-like substances of a different chemical composition are polyacrylates, polystyrenes and copolymerisates of styrene and acrylates. They are all commercially available in the form of approx. 40% anion-active dispersions under the designation "Hoeschst Licomer-Dispersion" and the type designations VP A11 and A53 (acrylates), S91 (styrene), and A41 (styrene-acrylate-copolymer).

The suitable waxes or wax-like substances have varying hardness and melting points preferably from 60° to 150° C. The hardest types, such as waxes having melting points from 120° to 150° C., can be used when the amount of component (B) is increased.

Examples of suitable products that may enter as component (B) are products of the following trade names and type designations: "Dow Corning Silicone Release-Emulsion", types 36 and 490, "Wacker Silicon Trenn-Emulsion", types E 10, E 22, E 101 and E 157, "Wacker Siliconöl", type AK 350, and "Rhone Poulenc Silicone Release-Emulsion", type SI 36.

These products are used either in the form of aqueous emulsions, containing from 35 to 50% active components, or in concentrated form, in which case they can be emulsified with the products mentioned under (E), (F) or (G) as emulsifiers.

Examples of suitable products that may enter as ingredient (C) are: "Dow Corning Silicon Tensid", type 198, and "Wacker Silicon Tensid", of the types L 03, L 06, VP 1661, and VP 1680.

Said products appear as colourless liquids, containing 100% active components, consisting of either siloxane-glycol-copolymer or modified organo-polysiloxane-copolymer. They are free from emulsifier and nonionic.

The modified polysiloxane-copolymers contain side groups of glycol, alkyd or alkyl which modify the solubility properties in different media.

Examples of suitable products that may enter as component (D) are: "Hoechst Fluowet" with the type designations CL, OP, OT, and PP, and "ICI Monflor 31", and "3M Fluorad" of the types FC 128, FC 134, 170, and FC 430. The Fluowet types are carboxy or oxethylate-modified, whereas Monflor consists of polymerisates of tetrafluoroethylene, and the Fluorad types are potassium-fluorinated alkyl carboxylates, fluorinated alkyl-quaternary ammonium iodide, fluorinated alkyl-polyoxyethylene ethanols, or fluorinated alkylesters.

Examples of suitable products that may enter as ingredient (E) are: "ICI Synperonic" of the types NX, NXP and NP-8 to NP-15, which are nonylphenol polyalkoxylates.

Instead of nonylphenol ethoxylate other alkylphenol alkoxylates having similar properties may be used. This designation comprises alkylphenolakoxylates of varying chain length. The alkyl group may suitably contain from 4 to 20 carbon atoms in the chain and the polyalkoxylate group from 5 to 30, preferably from 5 to 18 carbon atoms in the chain.

Other suitable products are "Hoechst Arkopal" of the types N-060 to N-150 (nonylphenol polyglycolether), "Hoechst Sapogenat" types T-060 to T-180 (tributylphenol polyglycolether), and "Hoechst Genapol", types X-050 to X-150 (isotridecanole polyglycolether).

All these compounds are nonionic surfactants, but all other nonionic surfactants having similar properties can be used.

Examples of suitable products that may enter as component (F) in an agent according to the invention are: "Cyanamid Aerosol", of the types AY (sodium diamyl sulphosuccinate), MA 80 (sodium dihexyl sulphosuccinate), and OT 75 (sodium dioctyl sulphosuccinate).

Examples of suitable products that may enter as component (G) in the agent according to the invention are: "Cyanamid Aerosol", of the type C-61 (ethanolated alkylguanidine amine complex), "Cyanamid Cyastat", of the types SN (stearamido propyldimethyl-$\beta$-hydroxyethyl-ammonium-nitrate) and SP (stearamido propyldimethyl-$\beta$-hydroxyethyl-ammonium-dihydrogen-phosphate).

For the preparation of the agent according to the invention demineralized water is preferably used as the homogeneous phase in an o/w emulsion.

If desired, a mixture of demineralized water and alcohol can be used, e.g. at the ratio 2:1. This may be the case when it is desired to prepare the agent as an aerosol product in order to reduce or completely eliminate the froth development of the agent.

The agent according to the invention is applicable e.g. with a wash leather or a pencil of suitable size, a brush, or e.g. in the form of an aerosol product may be sprayed on in an even layer covering completely the material which is subject to treatment, e.g. the surface of the record. In connection with records it is recommendable using a pencil or a brush for the application, partly in order to reduce waste, partly in order to obtain an even distribution. The application is performed most conveniently during playing or rotation of the turntable of the record player.

The treated record may subsequently be put aside for drying or played in the normal manner. The thorough moistening with the agent according to the invention loosens dust, dirt, fatty substances or other types of impurities on the material, e.g. in the groove of the record, and these impurities are also prevented from settling again. When the treated surface has dried, it is given a slight final drying, e.g. by means of a clean wad of cotton wool or a soft non-flocculating cloth. A final polish with a dry fine-haired brush or similar object is recommendable.

The surface now appears entirely clean and of a beautiful, deep gloss and is completely dry and very smooth. In connection with records it is recommended to increase the stylus pressure to the highest tracking force for the first 2 or 3 playings. This, however, applies only to top systems as a stylus pressure of from 10 to 15 mN is usually sufficient. The greasier and dirtier the record was, the higher tracking pressure must be used.

Moreover, it is recommended to check and possibly clean the pickup stylus after finished playing of the treated record. This is suitably done with a dry pencil as the agent according to the invention leaves no greasy product residues on the pickup stylus. The dust and dirt now loosened as well as superfluous product residues, if any, should of course be removed in order not to reduce the tracking ability.

This is done completely without difficulty, seeing that the gathered residues do not stick or fasten firmly. A record treated with the agent according to the invention has far superior properties in use than other records. This can be demonstrated for example in the following manner:

Two records, one of which has been treated with the agent according to the invention and the other not, are placed each on top of their respective inner sleeve. The surface of the records is then rubbed with a dry cloth, brush etc.

Thereafter, the edge of each record is taken hold of. As far as the untreated record is concerned, the unfortunate effect is ascertained that the inner sleeve is picked up with the record, which is due to the record having been charged with static electricity, thereby functioning i.a. as a dust magnet. As far as the treated record is concerned, however, the inner sleeve stays where it is, no matter how long or how vigorously the surface of the record is rubbed.

The agent according to the invention has produced an efficient antistatic effect, and the record no longer attracts dust and similar substances.

Even an extremely dirty record becomes good again following a treatment with the agent according to the invention.

Although the agent according to the invention has preferably been mentioned in connection with its use for surface treatment of records, it may also advantageously be used for the cleaning and treatment of sound heads and tape paths in tape recorders and pickup styli where the same problems of a physical and acoustic nature exist. The agent according to the invention, however, is also suitable for the cleaning and antistatic treatment of any object to which such treatment is significant, such as plastic articles of every kind, optical and photographic articles, especially optical lenses, television screens, etc.

The examples mentioned below will illustrate the preparation and use of the agent according to the invention.

EXAMPLE 1

One hundred ml of demineralized water is heated to from 75° to 85° C. and by means of a high-speed emulsifier apparatus of the type Ilado Laboratory Dispenser x 10/20 having a maximum number of revolutions of 30,000 rev./min.

While stirring, the following is added:

| | |
|---|---|
| (C) Wacker Silicon tensid LO3 100% | 0.03 ml |
| (D) ICI Monflor 31, 5% | 0.08 ml |
| (E) ICI Synperonic NX, 100% | 0.07 ml |

These components having been dissolved, the following components are added, stirring continuously, at from 75° to 85° C.:

| | |
|---|---|
| (A) Hoechst Wachs-Emulsion CSE/neu, 5% | 0.125 ml |
| (B) Wacker Silicon Trenn-Emulsion E22, 35% | 0.125 ml |

EXAMPLE 2

The following components are carefully stirred until a homogeneous mixture has been provided:

| | |
|---|---|
| (A) Hoechst Wachs-Emulsion CSE/neu, 5% | 0.125 ml |
| (B) Wacker Silicon Trenn-Emulsion E22, 35% | 0.132 ml |
| (C) Wacker Silicon Tensid LO3, 100% | 0.052 ml |
| (D) ICI Monflor 31, 5% | 0.079 ml |
| (E) ICI Synperonic NX, 100% | 0.111 ml |
| (F) Cynamid Aerosol OT, 5% | 0.091 ml |

While stirring the following is added to the obtained mixture:

| | |
|---|---|
| (H) Demineralized water | 100.0 ml |

The mixture is emulsified into a homogeneous and stable emulsion by means of the emulsifier apparatus described in Example 1 at 30,000 rev./min.

EXAMPLE 3

The following components are carefully stirred until a homogeneous mixture has been provided.

| | |
|---|---|
| (A) Hoechst Wachs-Emulsion CSE/neu, 5% | 0.125 ml |
| (B) Wacker Silicon Trenn-Emulsion E22, 35% | 0.132 ml |
| (C) Wacker Silicon Tensid LO3, 100% | 0.052 ml |
| (D) ICI Monflor 51, 5% | 0.079 ml |
| (E) ICI Synperonic NX, 100% | 0.111 ml |
| (G) Cyanamid Cyastat SN, 5% | 0.100 ml |

While stirring the following is added to the obtained mixture:

| | |
|---|---|
| (H) Demineralized water | 90.0 ml |
| (I) Isopropanol | 10.0 ml |

The mixture is emulsified in the same manner as indicated in Example 2. The obtained emulsion has improved stability against settling compared to the emulsion prepared in Example 2 which may be ascribed to the isopropanol content.

EXAMPLE 4

By the method stated in Example 1 to 3 emulsions are prepared, all of which are anion-active, according to the following recipes in which the components are stated by trade names and type designations:

| Emulsion 1 | |
|---|---|
| (A) Hoechst Wachs-Emulsion CSE/neu, 5% | 0.125 ml |
| (B) Wacker Silicon Trenn-Emulsion E22, 35% | 0.132 ml |
| (C) Wacker Silicon tensid LO3, 100% | 0.034 ml |
| (D) ICI Monflor 31, 5% | 0.079 ml |
| (E) ICI Synperonic NX, 100% | 0.074 ml |
| (F) Cynamid Aerosol OT, 5% | 0.091 ml |
| (H) Demineralized water | 100.0 ml |

| Emulsion 2 | |
|---|---|
| (A) Hoechst Wachs-Emulsion CSE/neu, 5% | 0.125 ml |
| (B) Wacker Silicon Trenn-Emulsion E22, 35% | 0.132 ml |
| (C) Wacker Silicon Tensid LO3, 100% | 0.052 ml |
| (D) ICI Monflor 31, 5% | 0.079 ml |
| (E) ICI Synperonic NX, 100% | 0.111 ml |
| (F) Cynamid Aerosol OT, 5% | 0.091 ml |
| (H) Demineralized water | 100.0 ml |

| Emulsion 3 | |
|---|---|
| (A) Hoechst Wachs-Emulsion CSE/neu, 5% | 0.125 ml |
| (B) Wacker Silicon Trenn-Emulsion E22, 35% | 0.132 ml |
| (C) Wacker Silicon tensid LO3, 100% | 0.069 ml |
| (D) ICI Monflor 31, 5% | 0.079 ml |
| (E) ICI Synperonic NX, 100% | 0.148 ml |
| (F) Cynamid Aerosol OT, 5% | 0.091 ml |
| (H) Demineralized water | 100.0 ml |

The above-mentioned three emulsions were prepared for test examination.

The only difference between the mixtures is an increase of components (C) and (E) of 50% from emulsion 1 to 2, and of 100% from emulsion 1 to 3.

This influences the physical as well as the acoustic conditions, the physical conditions being reduced concurrently with the increase of components (C) and (E).

At the same time there is an increase—an improvement—of the acoustic conditions.

Measurings have proved that the half-life period, i.e. the period required before a given electrostatic charge has fallen to half of its original value, remains low, typically from approx. 2 to 8 seconds.

For emulsion 1 the half-life period begins with approx. 2 seconds rising to 12.6 seconds.

For emulsion 3 the half-life period begins with approx. 2 seconds rising to 22.7 seconds.

The explanation hereof is that during the period corresponding to from 52 to 67 days the relative air humidity fell from approx. 40% to 33%.

After storing the surface-treated PVC records in a climate chamber having a relative air humidity of 44%, the half-life period was measured again, this time at 5 seconds for emulsion 1, and 10.4 seconds for emulsion 3.

It will appear from the above that ingredients (D) and (E) affect the achieved half-life periods per second and their stability. Thus, an increase of these components may reduce the half-life periods additionally as well as increase their stability, but in return this will be to the detriment of the acoustic conditions.

Emulsion 1 provides excellent acoustic conditions when using relatively high tracking forces—typically from 25 to 30 mN.—but a reduction of this force by, for example, 50% to between 12.5 and 15 mN. will result in ever increasing surface and playing noise, depending on the extent of the reduction. This phenomenon may be explained in that ingredients (D) and (F) are wax-like and of high adhesive properties and high degree of hardness.

Emulsion 2 provides excellent acoustic conditions when using the desired lower tracking force of between 12.5 and 15 mN.

For testing of the emulsion the following test equipment, characterized by manufacture and type designations, has been used:

| | |
|---|---|
| Pre-amplifier/amplifier | Sansui CA/BA 3000 |
| Record player | Sansui SR 929 |
| Pickup units | Stanton 500, 681, and 881 and Pickering UV 15/2400 Q and XUV 4500 Q |
| Tape recorder | Revox 700 |
| Loudspeaker | J. B. Lansing L 166 |

For each individual o/v emulsion a test diagram is written out containing information, like for example test date/s, solution No. referring to the formula of the o/v emulsion, the pickup unit used, and its tracking force, the manufacture of the PVC record used, as well as all significant physical and acoustic conditions that may affect the quality level obtainable.

Furthermore, there is a scale of points indicating from unsatisfactory to particularly excellent satisfactory conditions.

The diagram is filled in according to the above after each test.

The acoustic conditions are evaluated by very strict criteria, every single test starts with a tape recording of the untreated PVC record, said tape recording being used as a reference.

Hereafter, the PVC record is surface-treated during playing, and when it has been surface-treated and dried with a wad of synthetic cotton wool—but not given a final polish with a fine-haired brushing tool—the actual first playing takes place, said first playing being compared with the reference tape in an A/B test.

Hereafter, comparison playings are made at from two to four weeks' interval during test periods of from two to six months.

A few surface-treated PVC records being of quite particular interest are filed during considerably longer test periods, said records are comparison-played and measured and used as reference at intervals from four to eight weeks.

The tracking force used for these comparison playings is usually 10 mN., but otherwise varying between 7.5 and 17.5 mN.

The sound pressure during these tests varies between 90 dB and 96 dB, corresponding to an output of between 0.63 and 2.50 W.

The physical conditions are evaluated and analysed according to the friction method—mechanical influence—against the surface of the PVC record.

A wad of synthetic cotton wool is rubbed back and forth or in circles on the surface of the PVC record from 100 to 150 times, thereafter the electrostatic charge is measured by observing the attractive force of the fine fibres of the cotton wool.

Test Results

As mentioned under test methods, very low tracking forces are usually utilized.

These are so low that considerably increased surface and playing noise often occurs, as well as distortion during the reference playing. This is caused by the impurities which have gathered after playing only half or three quarters of the side of a record.

After finished surface treatment, without final polish of the surface of the PVC record by means of a fine-haired brushing tool, the PVC record is played the first time.

The result is remarkable in that the sound picture presents itself with greater precision and clarity over the entire range, with better and purer high-frequency reproduction, and with from none to a minimum of surface and playing noise.

This considerable and very remarkable improvement of the quality level occurs only in connection with the agent of the composition stated according to the invention.

Hereafter, the antistatic effect is measured, a wad of synthetic cotton wool being rubbed back and forth or in circles on the surface of the PVC record.

Following from 100 to 150 rubbings the cotton wool is held from two to three mm above the surface of the PVC record and is carried in a straight line from the outer groove to the inner groove, across the area having been exposed to the mechanical influence.

The result is remarkable in that no cotton wool fibres are attracted to the surface of the PVC record.

By way of comparison an untreated PVC record may become electrostatically charged following one rubbing on its surface with a wad of synthetic cotton wool so as to attract from 25 to 50 cotton wool fibres so vigorously that the attractive force may be registered very distinctly from twenty to thirty cm from the surface of the PVC record.

The above-mentioned 3 emulsions have been used for treatment of PVC records which have been treated by the method mentioned. The acoustic properties were measured by means of an equipment of the Brüel %

Kjaer manufacture, as well as test records of the CBS manufacture.

To a surprising degree the surface semi-conductive properties were reduced most in the PVC records that had been surface-treated with the o/v emulsions containing the largest quantity of (C) and (E).

This in spite of the fact that precisely (C) and partly (E) are distinctly antistatic agents.

Incidentally, the half-life period obtained at the time of the surface treatment, i.e. the period required before the electrostatic charge has fallen to half of its original value, remained low throughout the test period.

The test records used for evaluation of the transfer characteristic contained frequency sweeps from 500 Hz to 20 and 50 kHz, respectively, cut in the left, right and the left/right channel, respectively.

The first measurings contained a total variation of from −1.8 to 3.0 dB, the succeeding two measurings contained an almost identical curve compared with the reference. The succeeding and last measurings contained a total variation of from +0.4 to 0.8 dB.

This was remarkable as it signifies an improvement in the reproduction of the highest frequencies.

And this in spite of the fact that the surface of the test records was not polished with a fine-haired brushing tool after the surface treatment and before the test measurings.

During the measurings it was also observed that the applied film of the o/w emulsions resulted in a substantial and remarkable reducing effect of surface and playing noise, and of the content of impure and distorted frequencies in the test records.

EXAMPLE 5

An emulsion is prepared by heating 79 ml water to 85° C. and adding, while stirring, 0.264 ml of nonionic surfactant, 0.192 ml of a 10% solution of a fluorinated organic surface-active compound, and 0.239 ml of a polysiloxane copolymer in the order mentioned. When the substances added have been dissolved, there is added 0.386 ml of a 35% emulsion of dimethyl polysiloxane and 0.282 ml wax in said order. Thereafter, the mixture is emulsified for 15 minutes at a temperature of 75° C. in an emulsifier apparatus at a rate of revolution of 15,000 rev./min. Hereafter cooling to room temperature for 12–14 hours, emulsification again for 15 minutes, and at last addition of 21 ml isopropyl alcohol while stirring.

The cleaning agent prepared is well-suited for cleaning and permanent antistatic treatment of pickup styli, acrylic plastic, television screens and glasses and other optical and photographic articles, especially optical lenses.

EXAMPLE 6

The method described in Example 5 is repeated with the modification that instead of water and isopropyl alcohol there is used a volatile fluorinated hydrocarbon, and the mixing and the emulsification are performed at room temperature.

The emulsion obtained can be used in the same manner as the emulsion prepared according to Example 5, however shaking is required before use. The emulsion with a fluorinated hydrocarbon as emulsifying medium is particularly suitable for spraying from a spray tin, whereby extremely fast drying may be obtained.

EXAMPLE 7

According to the method described in Example 5 three emulsions are prepared having the following composition:

| Emulsion 1 | |
|---|---|
| (A) Wax (5% emulsion) | 0.018 ml |
| (B) Dimethyl polysiloxane (35% emulsion) | 0.025 ml |
| (C) Polysiloxane copolymer | 0.030 ml |
| (D) Fluorinated organic surface-active compound (10% solution) | 0.041 ml |
| (E) Nonionic surfactant | 0.033 ml |
| (H) Demineralized water | 65.0 ml |
| (I) Isopropyl alcohol | 35.0 ml |

| Emulsion 2 | |
|---|---|
| (A) Wax (5% emulsion) | 0.018 ml |
| (B) Dimethyl polysiloxane (35% emulsion) | 0.025 ml |
| (C) Polysiloxane copolymer | 0.030 ml |
| (D) Fluorinated organic surface-active compound (10% solution) | 0.020 ml |
| (E) Nonionic surfactant | 0.033 ml |
| (F) Sodium dialkyl sulphosuccinate (10% solution) | 0.022 ml |
| (H) Demineralized water | 65.0 ml |
| (I) Isopropyl alcohol | 35.0 ml |

| Emulsion 3 | |
|---|---|
| (A) Wax (5% emulsion) | 0.018 ml |
| (B) Dimethyl polysiloxane (35% emulsion) | 0.025 ml |
| (C) Polysiloxane copolymer | 0.030 ml |
| (D) Fluorinated organic surface-active compound (10% solution) | 0.020 ml |
| (E) Nonionic surfactant | 0.033 ml |
| (G) Stearamido propyldimethyl-$\beta$-hydroxyethyl ammonium (10% solution) | 0.024 ml |
| (H) Demineralized water | 65.0 ml |
| (I) Isopropyl alcohol | 35.0 ml |

All three emulsions are extremely well-suited for cleaning and surface treatment of video heads, sound heads and tape tracks in tape recorders. The use for these purposes offers great advantages. For example, considerably reduced wear and tear to tapes due to reduced surface friction is obtained, and at the same time impurities will have difficulty settling on the surface of the sound heads and blocking (causing a short-circuit) their magnetic slot.

EXAMPLE 8

For cleaning and surface treatment of pickup needles an agent of the following composition is suitable:

| (A) Wax (5% emulsion) | 0.036 ml |
|---|---|
| (B) Dimethyl polysiloxane (35% emulsion) | 0.049 ml |
| (C) Polysiloxane copolymer | 0.061 ml |
| (D) Fluorinated organic surface-active compound (10% solution) | 0.082 ml |
| (E) Nonionic surfactant | 0.067 ml |
| (H) Demineralized water | 79.0 ml |
| (I) Isopropyl alcohol | 21.0 ml |

The mixing is carried out in the manner stated in Example 5.

I claim:

1. An agent for surface treatment and cleaning of objects, comprising dissolved in a solution or emulsified in an emulsion:
   (A) from 0.001 to 1.2% by weight of natural or synthetic wax or wax-like substance,
   (B) from 0.001 to 2.5% by weight of fluid silicone oil with lubricating activity,
   (C) from 0.001 to 2.5% by weight of surface-active polysiloxane copolymer,
   (D) from 0.001 to 1.2% by weight of fluorinated organic surface-active compound, and
   (E) from 0.001 to 2.5% by weight of nonionic surfactant wherein the % by weight is based on the total weight of the solution or emulsion.

2. The agent according to claim 1 which contains dissolved in the solution or emulsified in the emulsion (F) from 0.001 to 1.2% by weight of sodium dialkyl sulphosuccinate.

3. The agent according to claim 1, which contains dissolved in the solution or emulsified in the emulsion (G) from 0.001 to 1.2% by weight of phosphate or nitrate of stearamido propyldimethyl-$\beta$-hydroxyethyl ammonium.

4. The agent according to claim 1, consisting of an aqueous medium in which the following components have been emulsified in an emulsion:
   (A) from 0.001 to 0.3% by weight of wax,
   (B) from 0.004 to 2.0% by weight of dimethyl polysiloxane or a copolymer hereof,
   (C) from 0.004 to 1.5% by weight of siloxane glycol copolymer or organopolysiloxane copolymer, containing side groups of glycol, alkyd or alkyl,
   (D) from 0.001 to 0.3% by weight of fluorinated organic surface-active compound, and
   (E) from 0.004 to 1.5% by weight of nonylphenol ethoxylate, the quantities being based on the total weight of the emulsion.

5. A concentrate comprising:
   (A) from 0.001 to 1.2 parts by weight of natural or synthetic wax or wax-like substance,
   (B) from 0.001 to 2.5 parts by weight of fluid silicone oil with lubricating activity,
   (C) from 0.001 to 2.5 parts by weight of surface-active polysiloxane copolymer,
   (D) from 0.001 to 1.2 parts by weight of fluorinated organic surface-active compound,
   (E) from 0.001 to 2.5 parts by weight of non-ionic surfactant.

6. The concentrate of claim 5 further comprising:
   (F) an amount of solvent or emulsifying medium sufficient to render the product liquid.

7. The concentrate of claim 6, in which the solvent or emulsifying medium is water.

* * * * *